United States Patent [19]

Wahl

[11] 4,190,025
[45] Feb. 26, 1980

[54] TIMING CHAIN TENSIONERS

[76] Inventor: Heinz Wahl, 2418 N. Utah St., Arlington, Va. 22207

[21] Appl. No.: 872,259

[22] Filed: Jan. 25, 1978

[51] Int. Cl.² ........................... F01L 1/46; F16H 7/12
[52] U.S. Cl. ........................... 123/90.31; 123/90.37; 123/90.38; 123/195 A; 123/198 E; 74/242.1 FP; 74/242.8
[58] Field of Search ............... 123/90.31, 90.33, 90.37, 123/90.38, 195 A, 195 C, 195 S, 198 E; 74/242.1 FP, 242.1 R, 242.8

[56] References Cited

U.S. PATENT DOCUMENTS

| 812,899 | 2/1906 | Thacher | 74/242.1 FP |
| 2,893,255 | 7/1959 | Bayliss | 74/242.8 |
| 2,963,918 | 12/1960 | Blakstad | 74/242.8 |
| 4,077,272 | 3/1978 | Busso | 74/242.1 FP |

FOREIGN PATENT DOCUMENTS

| 2144688 | 3/1973 | Fed. Rep. of Germany | 74/242.1 FP |
| 1725015 | 2/1976 | Fed. Rep. of Germany | 74/242.1 FP |
| 2525352 | 9/1976 | Fed. Rep. of Germany | 74/242.8 |
| 788500 | 1/1958 | United Kingdom | 74/242.1 FP |

Primary Examiner—Ronald H. Lazarus
Assistant Examiner—Jeffrey L. Yates
Attorney, Agent, or Firm—Wigman & Cohen

[57] ABSTRACT

This disclosure relates to improvements in hydraulic dashpot chain tensioners for the timing chains of motor vehicles. A kit for modifying existing chain tensioners is disclosed which can be readily connected to a chain tensioner to eliminate leakage of air into the dashpot. The kit comprises an open, cup-like oil reservoir adapted to be sealingly secured to the chain tensioner in fluid communication with the dashpot. Baffles are arranged adjacent the open end of the cup member to prevent loss of oil therefrom by reason of centrifugal forces acting on the oil.

8 Claims, 5 Drawing Figures

TIMING CHAIN TENSIONERS

BACKGROUND OF THE INVENTION

The present invention relates to chain tensioners and more particularly to an improved hydraulic dashpot chain tensioner for the valve timing chain of an internal combustion engine.

Heretofore, certain internal combustion engines for motor vehicles, notably, the engines for the high performance sports automobiles, employ metallic roller-type timing chains for driving the camshaft in synchronism with the crankshaft of the engine. To assure trouble-free operation of these engines, it is particularly important to apply constant tension to the timing chains so as to eliminate any vibration or snaking of the chains over the full range of engine operating speeds. The problem of providing constant tension of such timing chains has long been recognized by the prior art and a number of devices have been proposed to solve this problem. These prior art devices have met with reasonable success in providing a means for maintaining constant tension on the timing chains, however, there are other difficulties with the prior art devices associated with the operating conditions of the automobile which result in occasional failure of the chain tensioner. Although failures of the known devices are infrequent, when they occur, the result can be catastropic. For example, when one known type of chain tensioner fails, it can happen that the timing chain becomes sufficiently slack that it jumps from the driving sprocket wheels and drives the camshaft so far out of synchronism with the crankshaft as to cause a valve to be driven into a piston head of the engine. Other failures have less catastrophic effects but can result in breakage of or damage to the timing chain requiring costly repairs.

Typically, the prior art chain tensioners include a housing fixedly mounted within the timing chain cover on the engine block. A cylinder, open at one end, is formed in the chain tensioner housing for receiving a piston having a plunger arranged to bear against a pivotally mounted support arm for a sprocket wheel to urge the sprocket wheel against the chain and keep the latter in tension. The piston is biased outwardly by a coil spring and the closed end of the cylinder behind the piston is filled with lubricating oil to form a dashpot for absorbing large, short duration loads, such as might be experienced by whipping or snaking of the timing chain, and for maintaining constant tension on the chain. The chain tensioner housing includes an upstanding rim arranged about the plunger at the open end of the cylinder for retaining oil expressed from and supplied to the dashpot. However, during hard turns of the automobile the oil tends to spill over the rim and air is permitted to be drawn into the dashpot.

To at least partly overcome this problem, in a more recent known chain tensioner design, a further annular piston is arranged in the open end of the cylinder, sealed about the plunger and cylinder wall by O-rings and biased outwardly to apply a positive pressure to the oil in the chain tensioner. This design was intended to avoid the aforementioned spillage problem by providing a completely sealed, pressurized chain tensioner.

During periods of time when the engine is not operating, it is possible to collapse the dashpot, that is, urge the chain tensioner plunger into the cylinder, by the force of a compressed valve spring. This occurs because the valve stem of the valve associated with the compressed valve spring bears with sufficiently great force upon a cam on the camshaft that the camshaft is caused to rotate. This rotation of the camshaft is transmitted by the timing chain to the plunger of the chain tensioner with a force great enough to overcome the force of the coil spring arranged behind the piston. Because the force of the compressed valve spring is relatively constant, large and long duration under these circumstance, the dashpot valve will bypass oil from behind the piston and thereby cause collapse of the plunger into the cylinder. Upon start-up, this long duration force is relieved and the dashpot piston will be urged outwardly to its normal operating position by the coil spring and oil will be sucked back into the dashpot chamber. If insufficient oil is retained in the upstanding rim of the first of the prior art chain tensioners described above, air will be drawn into the dashpot.

The seals of the annular piston of the modified prior art chain tensioner described above are subjected to damage, for example, by foreign matter in the oil, by damage caused during normal wear, by heat and age hardening of the seals and the like. If these seals are or become damaged, it is possible and, indeed, likely that oil will leak past the seals so that air will be drawn into the chain tensioner cylinder, especially during the start-up conditions described above. When this occurs, the chain tensioner is essentially inoperative and the aforementioned failures can result.

SUMMARY AND OBJECTS OF THE INVENTION

In view of the foregoing disadvantages and shortcomings of the prior art devices, as well as other disadvantages not specifically mentioned above, it should be apparent that there still exists a need in the art for an improved chain tensioner device which is not subject to the drawbacks of the prior art devices and which, completely eliminates the possibility of the aforementioned failures. It is, therefore, a primary objective of this invention to fulfill this need by providing a simple, inexpensive modification of the more recent design of the prior art devices.

More particularly, it is an object of this invention to provide a separate dashpot fluid reservoir communicating with the cylinder of the chain tensioner which reservoir is open to the atmosphere within the timing chain housing.

It is another object of this invention to provide an open dashpot fluid reservoir for the chain tensioner, which reservoir is arranged and constructed to be self-replenished by oil droplets in the atmosphere of the timing chain housing and from which reservoir spillage caused by centrifugal forces is precluded by means of appropriately arranged baffles.

Yet another object of this invention is to provide a simple, inexpensively manufactured modification kit, by means of which existing chain tensioner devices can be readily modified according to the present invention.

Briefly described, the aforementioned objects are accomplished according to the present invention by providing a cup-like dashpot fluid reservoir which is adapted to be threadably and sealingly affixed in a threaded bore of a prior art chain tensioner in communication with the fluid in the chain tensioner dashpot cylinder. The reservoir is open at its upper end and is provided with a pair of inclined baffles to inhibit spillage of fluid from the reservoir by reason of centrifugal forces resulting from turns, hard cornering and maneuvering of the automobile on winding roads and the like. The inclination of the baffles also advantageously aids in collecting lubricating oil droplets entrained in the atmosphere of the timing chain housing so as to maintain the reservoir constantly replenished with oil. The confronting edges of the baffles form a longitudinal slit or aperture, the axis of which is arranged parallel to the longitudinal axis of the engine crankshaft. To prevent entry of foreign matter, such as metal filings and the like, into the reservoir and from the reservoir into the dashpot cylinder of the chain tensioner, a fine-mesh filter screen is provided for the reservoir, preferably, just above or beneath the longitudinal aperture between the baffles.

In accordance with the present invention, it is contemplated that the fluid reservoir will be provided as an inexpensive modification kit for adapting existing chain tensioners for operation according to the principles described herein. It is, however, within the scope of the present invention to construct a chain tensioner housing with an integrally formed fluid reservoir having the features and structural elements described herein.

With these and other objects, advantages and features of the invention that may become hereinafter apparent, the nature of the invention may be more clearly understood by reference to the following detailed description of the invention, the appended claims and to the several views illustrated in the attached drawings, wherein:

DETAILED DESCRIPTION OF A PREFERRED EMBODIMENT

Figure 1:
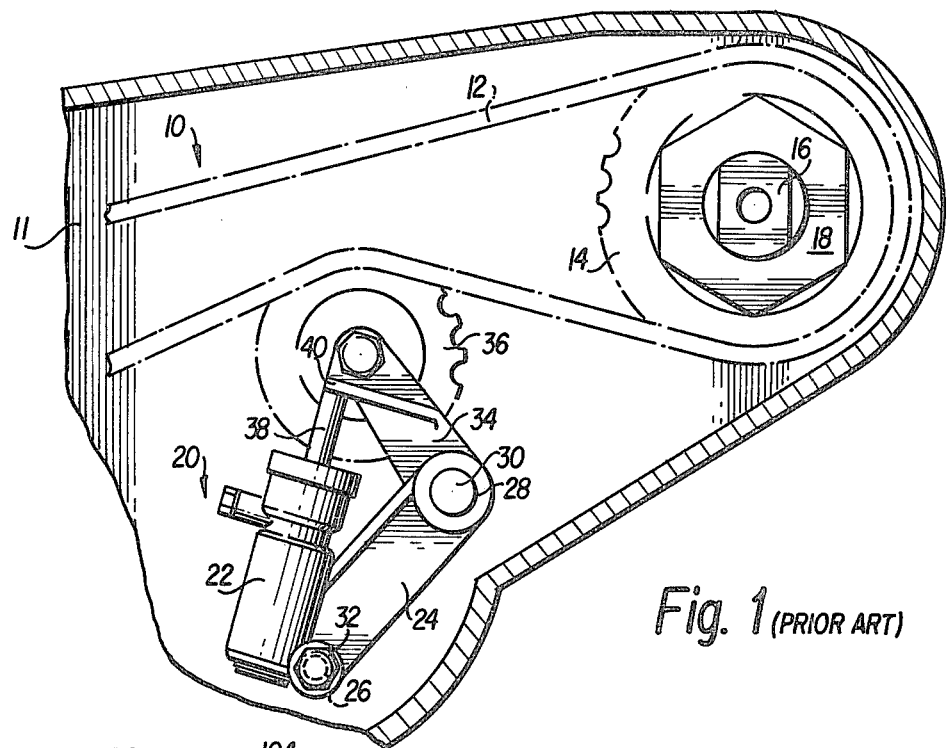
FIG. 1 is a front elevation view showing a prior art chain tensioner arranged in tensioning relationship with a timing chain of the internal combustion engine of a Porsche 911 motor vehicle.

Referring now in detail to the drawings, there is illustrated a portion of the structure of an internal combustion engine in sufficient detail that those skilled in the art will fully appreciate the underlying concepts of the invention and the structure by which the invention may be carried out. In FIG. 1 there is shown a prior art timing chain and chain tensioner arrangement designated generally by reference numeral 10. The arrangement 10 is housed in a timing chain housing 11 of the engine and comprises a metallic roller-type timing chain 12 trained about a sprocket chain wheel 14, the latter being secured to the end of a camshaft 16 by means of a nut 18. The end of the chain 12, toward the left as viewed in FIG. 1, is adapted to be trained about a sprocket wheel connected to a countershaft engaged with the engine crankshaft in a well-known and, therefore, not illustrated manner. A chain tensioner, identified generally by reference numeral 20, includes a chain tensioner housing 22 having an integrally formed bracket 24 provided with through bores 26, 28 at its opposite ends. Chain tensioner 20 is adapted to be secured within the timing chain housing 11 of the engine by means of an upstanding stud 30 affixed to the timing chain housing and a bolt 32 which engages in a threaded bore (not shown) in the timing chain housing. A chain wheel support arm 34 is pivotally mounted on stud 30 behind the bracket 24 as viewed in FIG. 1 and has a chain tensioner sprocket wheel 36 rotatably mounted at its free end in meshing engagement with the timing chain 12.

Within the chain tensioner, housing 22, as more fully described hereinafter in connection with FIG. 2, there is arranged a hydraulic dashpot including a cylinder and spring-biased piston, a plunger 38 of which protrudes out of the cylinder in housing 22 and bears against a ledge 40 of support arm 34 so as to rotate the support arm 34 and chain wheel 36 clockwise about the axis of stud 30 and thereby maintain timing chain 12 under substantially constant tension.

Figure 2:
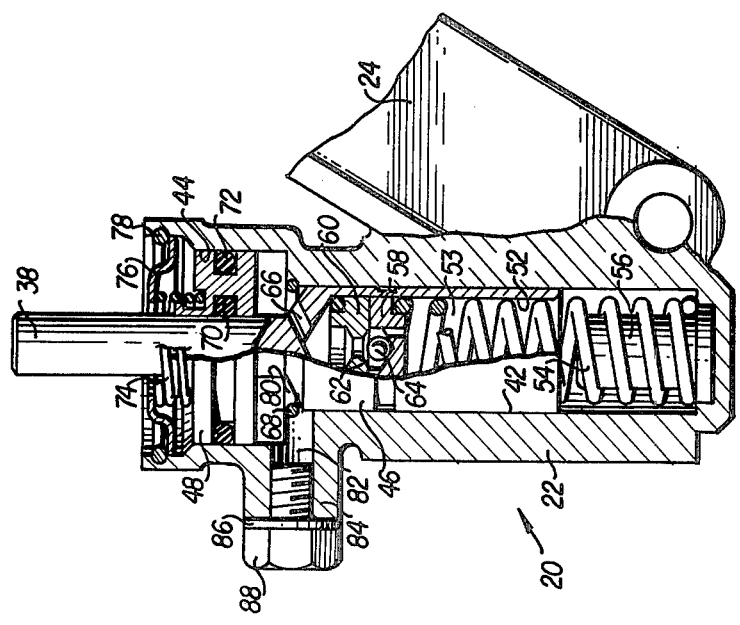
FIG. 2 is a fragmentary cross-sectional view of a prior art chain tensioner.

Referring now to FIG. 2, the internal construction of the chain tensioner 20 will be described in greater detail. It will be appreciated from the showing of FIG. 2 that the chain tensioner 20 comprises a spring-biased, hydraulic dashpot, the function and operation of which are considered well-known to those skilled in the art. The chain tensioner housing 22 is provided with internal, stepped cylindrical bores 42, 44 of different diameters which define cylinders for slidably receiving a chain tensioner piston 46 and an annular sealing piston 48, respectively.

Piston 46 is formed at its lower end with an internal bore 52 and at its upper end with a solid plunger 38. Internal bore 52 and cylindrical bore 42 define a dashpot chamber 53. The piston 46 is biased upwardly against locking ring 68 by a coil spring 54 which bears at its lower end upon a plastic spring guide 56. Spring 54 extends upwardly into internal bore 52 into engagement with the lower side of a ball retainer or cage 58 of the dashpot valve. Arranged above the ball retainer 58, is an intermediate piece 60, the underside of which is formed with a dashpot valve seat 62 for ball 64. One or more openings 66 are provided in the piston 46 above the dashpot valve, through which opening 66 a steel wire may be inserted to depress the ball 64 from seat 62 for bleeding air from the dashpot chamber 53 during assembly of the chain tensioner in a well-known manner.

Annular oil retainer piston 48 is slidably received on plunger 38 and is provided with circumferential grooves for receiving inner and outer O-ring seals 70, 72 for sealingly engaging the plunger 38 and bore 44, respectively. Piston 48 is downwardly biased by a coil spring 74 which is retained by a spring retainer plate 76 and locking ring 78. A fluid chamber 80 is defined by the piston 46, the bore 44 and the lower surface of piston 48. Air bleed passage 82 is provided in a boss 84 of the housing 22 for bleeding air from chamber 80. Air bleed passage 82 is sealed by means of a copper washer 86 and bleeder screw 88.

During assembly, the piston 46 and associated dashpot valve elements are installed in the cylindrical bore 42 in the housing, secured by means of the locking ring 68 and the dashpot is filled with oil and bled of air. Thereafter, the upper bore 44, with the bleeder screw 88 and copper washer 86 sealingly secured in place, is filled with oil and the oil retainer piston 48, spring 74, spring retainer plate 76 and locking ring 78 are installed. The bleeder screw 88 is then removed and chamber 80 is bled of air via passage 82.

During operation of the internal combustion engine with which the above-described chain tensioned is employed, damage to the O-ring seals 70, 72 which may have occurred as described above permit oil to leak past the seals and air to leak back across these seals into the oil chamber 80 and eventually into the dashpot chamber 53. When air, even in small quantities, is present in the dashpot chamber, the dashpot action of the chain tensioner is detrimentally affected. Because of the compressibility of air, the dashpot cannot effectively absorb large, short duration forces applied to the chain tensioner by the chain. Thus, the presence of even small amounts of air in the dashpot chamber render the chain tensioner substantially inoperative.

Figure 3:
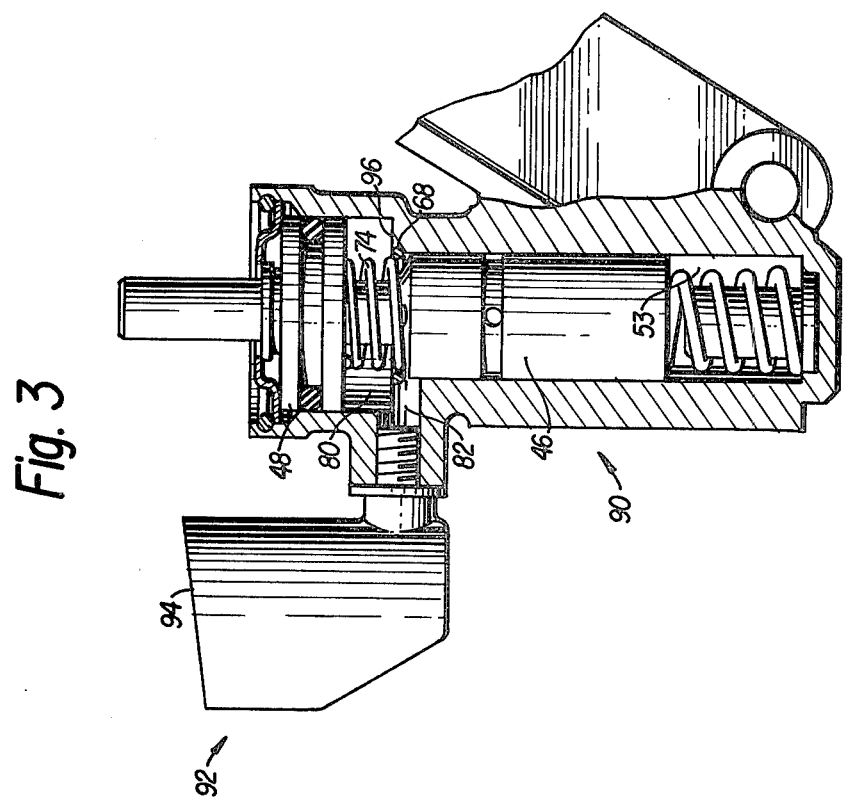
FIG. 3 is a fragmentary cross-sectional view of the chain tensioner of FIG. 2 modified in accordance with the present invention.

FIG. 3 illustrates a chain tensioner 90 incorporating the improvement according to the present invention. Since the internal construction of chain tensioner 90 is substantially identical to the chain tensioner 20 of FIGS. 1 and 2, only so much of the description of the structure and operation thereof will be repeated as to enable those skilled in the art to understand and appreciate the present invention.

It will be seen that the bleeder screw 88 of the chain tensioner of FIG. 2 has been removed and replaced by a fluid reservoir 92 having an upper end 94 open to the atmosphere within the timing chain housing. The details of this reservoir will be more fully described in connection with FIGS. 4 and 5. Because the fluid reservoir 92 is open to a pressure approximating atmospheric pressure, the coil spring 74, if arranged to urge the annular piston 48 downwardly as in FIG. 2, would force the fluid from the chamber 80 and out through the air bleed passage 82 into reservoir 92. This disadvantageously reduces the volume of dashpot fluid available for supplying the hydraulic dashpot of the chain tensioner. Accordingly, it is greatly preferred in the embodiment of the invention shown in FIG. 3 to arrange the coil spring 74 between the piston 48 and the horizontal step 96 and/or locking ring 68 so as to urge piston 48 upwardly.

Figure 4:
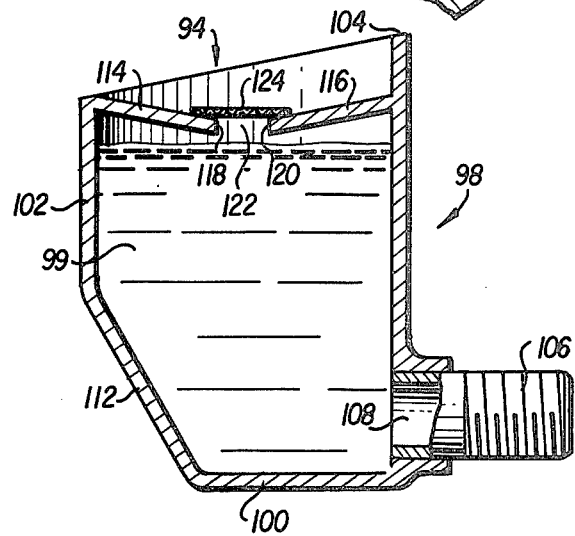
FIG. 4 is a cross-sectional view of the oil reservoir of the present invention.
Figure 5:
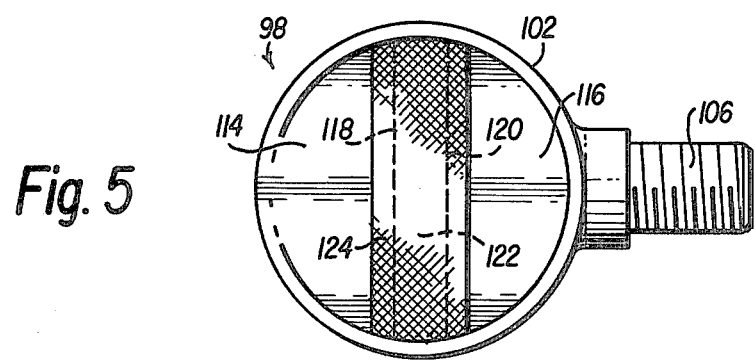
FIG. 5 is a top view of the oil reservoir of the present invention.

Referring now to FIGS. 4 and 5, the fluid reservoir comprises a cup member 98 filled with oil 99 and having a base 100 and a generally cylindrical wall 102. Wall 102 terminates in an upper lip 104 defining an upwardly open end 94 of the cup member 98. A threaded nipple 106 having an axial bore 108 is sealingly affixed, by welding, bonding or the like, to the wall 102 adjacent base 100 in such a way that the bore 108 is in fluid communication with the oil in the reservoir. The threads of the nipple correspond to the threads of the bleeder screw 88 shown in FIG. 2.

The shape of the cup member 98, i.e., the inclination of the upper lip 104 and the flattened portion 112 of the cup wall, is determined by the need to avoid interference with other engine components arranged in the timing chain housing when the fluid reservoir is installed on the chain tensioner as shown in FIG. 3. Thus, the invention contemplates that other shapes and sizes of the cup member 98 may be utilized.

Affixed adjacent the upper lip 104 of cup member 98 are a pair of generally semi-circular baffle plates 114, 116 having confronting edges 118, 120 defining an elongate aperture 122 therebetween. Baffle plates 114, 116 are provided for preventing spillage or loss of fluid from the reservoir when acted upon by centrifugal forces as described above. A lubricating oil mist atmosphere exists within the timing chain housing during operation of the motor vehicle engine so that oil droplets are collected on the baffle plates and flow into the reservoir via the aperture 122. In this way, the reservoir is continually replenished with oil so there is no danger of air entering the chain tensioner via the axial bore 108.

Aperture 122 is arranged substantially perpendicular to bore 108 so that it will be oriented parallel to the engine crankshaft. This orientation of the lengthwise axis of the aperture 122 is preferred since the aforementioned centrifugal forces are maximum in a direction transverse to the engine crankshaft. As shown in FIG. 4, the baffle plates are inclined downwardly toward the aperture 122 so that fluid collected on the plates will readily flow into the reservoir via the aperture. To prevent entry of foreign matter into the fluid reservoir which might flow into and interfere with the operation of the hydraulic dashpot of the chain tensioner, a filter screen 124 is secured over the aperture 122 by any suitable and, therefore, not particularly described means.

Referring again to FIG. 3, it will be appreciated that since the pressure in chamber 80 is maintained at substantially the pressure existing within the timing chain housing, there is substantially no pressure differential across the O-ring seals of the retainer piston 48 so that there is virtually no possibility that air will leak past such seals and into chamber 80 and thence into the hydraulic dashpot chamber 53. Therefore, should the piston 46 be depressed by the force of the valve springs acting upon the camshaft as described hereinabove, the lower pressure created in the dashpot chamber 53 when the piston 46 extends upon engine start-up will draw only oil into dashpot chamber 53. There is thus assured, according to the present invention, continued, trouble-free operation of the chain tensioner device.

Although only a presently preferred embodiment is specifically illustrated and described herein, it will be appreciated that many modifications and variations of the present invention are possible in light of the above teachings and within the purview of the appended claims without departing from the spirit and intended scope of the invention.

What I claim is:

1. In a chain tensioner for a timing chain of an internal combustion engine having a crankshaft, a chain tensioner wheel arranged on a pivotable support arm in meshing engagement with said timing chain, said chain tensioner and timing chain arranged in a timing chain housing of said engine, said chain tensioner comprising a chain tensioner housing, a hydraulic dashpot arranged in said chain tensioner housing, said hydraulic dashpot including a cylinder, a dashpot valve and a piston arranged in said cylinder, said piston having a plunger bearing against said support arm and pivoting said chain tensioner wheel into tensioning relationship with said timing chain, a resilient element in said cylinder for urging the plunger of said piston toward said support arm, the improvement comprising a fluid reservoir affixed to said chain tensioner housing in fluid communication with the cylinder, said fluid reservoir having an upwardly open end for exposing the fluid in said reservoir to the atmosphere in said timing chain housing and for collecting oil droplets entrained in said atmosphere, baffle means arranged adjacent the open end of the reservoir for limiting loss of oil from said reservoir caused by centrifugal forces acting on the oil in said reservoir, said baffle means comprising a pair of plates affixed to said reservoir adjacent the upper open end thereof, said plates having confronting edges defining an elongated aperture therebetween, the lengthwise axis of said aperture extending substantially parallel to the crankshaft of said engine.

2. The improvement according to claim 1, wherein said reservoir comprises a cup member having an upper lip, said baffle means comprising a pair of plates affixed to said cup member adjacent the upper lip thereof, said plates having confronting edges defining an elongated aperture therebetween, the lengthwise axis of said aperture extending substantially parallel to the crankshaft of said engine.

3. The improvement according to claim 1, including filter means arranged in said reservoir for filtering foreign matter from oil droplets entering said reservoir through said aperture from the atmosphere of said timing chain housing.

4. The improvement according to claim 1, wherein said plates are inclined downwardly toward said aperture for permitting oil collected from the atmosphere of the timing chain housing to flow into said aperture.

5. The improvement according to claim 1, wherein said fluid reservoir and housing include means for detachably and sealingly affixing said reservoir to said chain tensioner housing.

6. A kit for modifying a chain tensioner for the timing chain of an internal combustion engine having a crankshaft, said chain tensioner adapted to be arranged in a timing chain housing of said engine and comprising a chain tensioner housing, a hydraulic dashpot arranged in said chain tensioner housing, said dashpot including a cylinder, a dashpot valve and a piston arranged in said cylinder, an air bleed passage through said chain tensioner housing in fluid communication with the fluid in said cylinder, said kit comprising a cup member defining a fluid reservoir for containing oil, said cup member having an open end adapted to be in communication with the atmosphere in said timing chain housing, means for securing said cup member to said chain tensioner housing and for placing the fluid reservoir in fluid communication with said air bleed passage, baffle means arranged adjacent the open end of the cup member for limiting loss of oil from said reservoir caused by centrifugal forces acting on the oil in said reservoir, said baffle means comprising a pair of plates affixed to said cup member adjacent the open end thereof, said plates having confronting edges defining an elongated aperture therebetween, the lengthwise axis of said aperture extending substantially parallel to said crankshaft.

7. A kit according to claim 6, wherein said securing means comprises a threaded nipple extending radially from said cup member, said nipple having an axial bore therethrough, said baffle means comprising a pair of plates affixed to said cup member adjacent the open end thereof, said plates having confronting edges defining an elongated aperture therebetween, the lengthwise axis of said aperture extending substantially perpendicular to the bore of said nipple.

8. A kit according to claim 6, including filter means arranged across said aperture on one side of said plates for filtering foreign matter from oil entering the cup member through said aperture, said plates being downwardly inclined toward said aperture for permitting oil collected from the atmosphere of the timing chain housing to flow through said aperture.

* * * * *